(12) United States Patent
Tachiiwa et al.

(10) Patent No.: US 9,157,596 B2
(45) Date of Patent: Oct. 13, 2015

(54) VEHICLE LAMP

(71) Applicant: KOITO MANUFACTURING CO., LTD., Tokyo (JP)

(72) Inventors: Takeyuki Tachiiwa, Shizuoka (JP); Manabu Maeda, Shizuoka (JP); Kazutami Oishi, Shizuoka (JP); Yuki Takahashi, Shizuoka (JP)

(73) Assignee: KOITO MANUFACTURING CO. LTD., Tokyo (JP)

( * ) Notice: Subject to any disclaimer, the term of this patent is extended or adjusted under 35 U.S.C. 154(b) by 48 days.

(21) Appl. No.: 14/095,114

(22) Filed: Dec. 3, 2013

(65) Prior Publication Data

US 2014/0169009 A1   Jun. 19, 2014

(30) Foreign Application Priority Data

Dec. 17, 2012 (JP) ................. 2012-274786

(51) Int. Cl.
  *B60Q 1/068* (2006.01)
  *F21S 8/10* (2006.01)
  *B60Q 1/06* (2006.01)

(52) U.S. Cl.
  CPC ............ *F21S 48/1317* (2013.01); *B60Q 1/06* (2013.01); *F21S 48/33* (2013.01); *F21S 48/335* (2013.01); *B60Q 2200/32* (2013.01)

(58) Field of Classification Search
  CPC ...... B60Q 1/068; B60Q 1/076; B60Q 1/0683; B60Q 1/06; F21S 48/1317; F21S 48/25; F21S 48/255; F21S 48/335; F21S 48/33
  See application file for complete search history.

(56) References Cited

U.S. PATENT DOCUMENTS

| 5,743,618 A * | 4/1998 | Fujino et al. ................. 362/528 |
| 6,550,947 B1 * | 4/2003 | Kibayashi ..................... 362/515 |
| 2003/0117810 A1 * | 6/2003 | Nakazawa et al. ............ 362/515 |

FOREIGN PATENT DOCUMENTS

JP           S6419205           1/1989

* cited by examiner

*Primary Examiner* — Bao Q Truong
(74) *Attorney, Agent, or Firm* — Abelman, Frayne & Schwab

(57) ABSTRACT

Disclosed is a vehicle lamp capable of improving a production efficiency, reducing a cost, and shortening a production line as compared to a case in which a dedicated mechanical equipment is used. The vehicle lamp includes an optical unit, a pivot member fixed to a bracket of the optical unit, a lamp body having a bearing insertion hole, and a bearing member which is fixed to the lamp body to be engageable with the pivot member. The pivot member and the bearing member are engaged with each other to constitute at least one supporting unit of an aiming mechanism. In addition, the optical unit is tiltably supported by the aiming mechanism and the bearing member is fixed to the lamp body by being inserted into the bearing insertion hole.

12 Claims, 8 Drawing Sheets

VEHICLE LAMP

CROSS-REFERENCE TO RELATED APPLICATIONS

This application is based on and claims priority from Japanese Patent Application No. 2012-274786, filed on Dec. 17, 2012, with the Japan Patent Office, the disclosure of which is incorporated herein in its entirety by reference.

TECHNICAL FIELD

The present disclosure relates to a vehicle lamp.

BACKGROUND

A conventional vehicle lamp has been provided with an aiming mechanism configured to adjust an optical axis of irradiation light. For example, Japanese Utility Model Laid-Open Publication S64-019205 discloses a vehicle lamp that is provided with an aiming fulcrum pivot as an aiming mechanism in which an angle of a reflector is adjusted by the aiming fulcrum pivot to perform aiming adjustment.

SUMMARY

In the vehicle lamp disclosed in Japanese Utility Model Laid-Open Publication S64-019205, the aiming fulcrum pivot is configured by a pivot section engaged with a pivot bearing attached to a reflector or a bracket thereof, and an insert section inserted into a lamp body.

When the aiming fulcrum pivot is assembled with the lamp body, a dedicated mechanical equipment is required to embed the insert section in the lamp body. When the dedicated mechanical equipment is used, a production efficiency is lowered due to the increase of the number of manufacturing steps as well as a cost for the mechanical equipment is incurred. Further, when the dedicated mechanical equipment is provided on a production line, an installation space thereof is required, thereby lengthening the production line.

An object of the present disclosure is to provide a vehicle lamp capable of improving a production efficiency, reducing a cost, and shortening a production line as compared to a case in which a dedicated mechanical equipment is used.

In order to solve the above described problem, a vehicle lamp according to the present disclosure includes an optical member, a first member fixed to the optical member, a lamp body having an opening, and a second member which is fixed to the lamp body to be engageable with the first member. The first member and the second member are engaged with each other to constitute at least one supporting unit of an aiming mechanism. In addition, the optical member is tiltably supported by the aiming mechanism and the second member is fixed to the lamp body by being inserted into the opening.

In the vehicle lamp of the present disclosure, the lamp body has a cylindrical fixing portion configured to fix the second member to a periphery of the opening, and a thickness of the fixing portion may be larger than a thickness of an outer wall of the lamp body in an insertion direction of the second member.

In the vehicle lamp of the present disclosure, a waterproof pin may be formed on an outer circumference of the second member. The waterproof pin is configured to be in contact with an inner circumferential surface of the cylindrical fixing portion.

In the vehicle lamp of the present disclosure, the second member may be integrally formed with a seal member at a portion where the second member is locked to an outer wall surface around the opening of the lamp body. The seal member is configured to water-tightly seal the opening.

In the vehicle lamp of the present disclosure, the second member may be fixed to the lamp body by being rotated around an axis in an insertion direction of the second member after being inserted into the opening.

According to the present disclosure, there may be provided a vehicle lamp capable of improving a production efficiency, reducing a cost, and shortening a production line as compared to a case in which a dedicated mechanical equipment is used.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, a vehicle lamp according to an exemplary embodiment of the present disclosure will be described with reference to accompanying drawings.

Figure 1A:
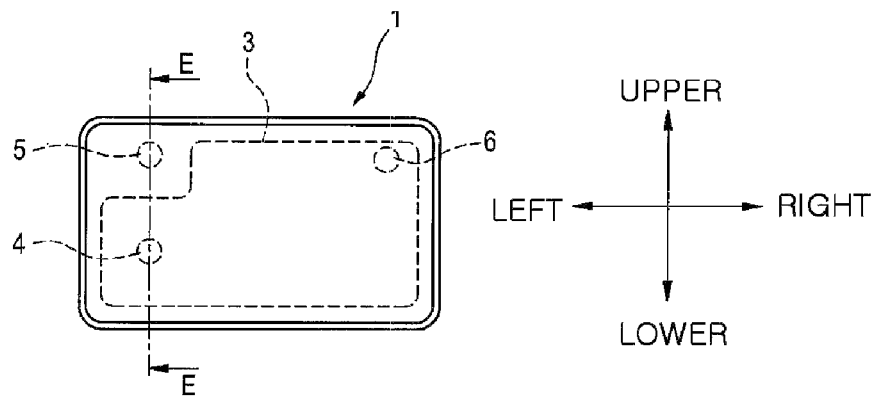
FIG. 1A is a plan view of a vehicle lamp according to an exemplary embodiment of the present disclosure.
Figure 1B:
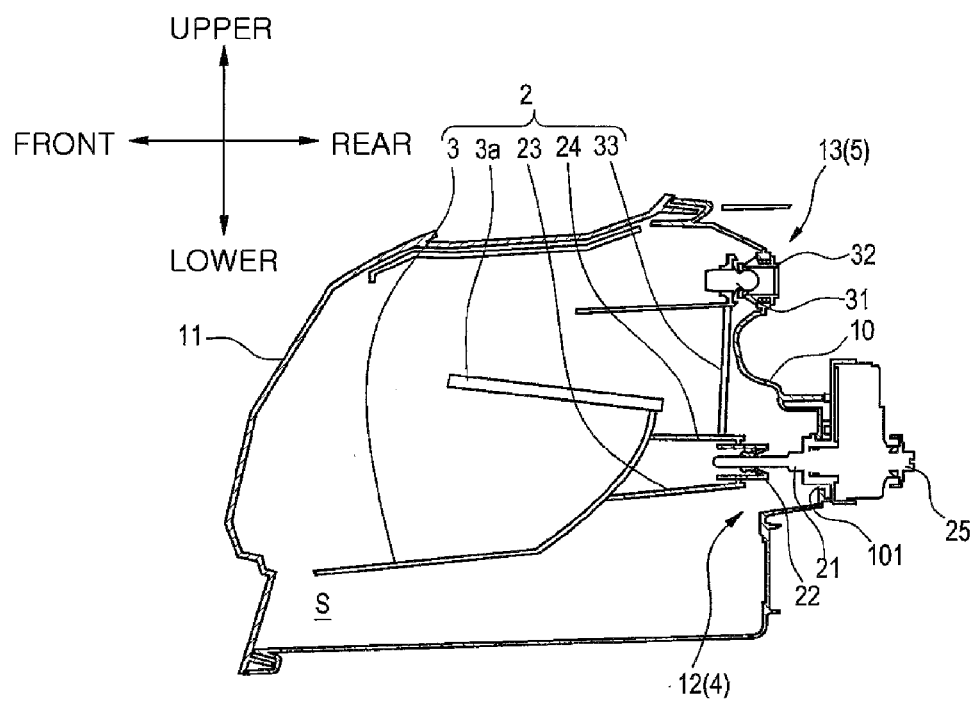
FIG. 1B is a cross-sectional view taken along line E-E in FIG. 1A.

FIG. 1A illustrates a plan view of a vehicle lamp 1 disposed in a front portion (front surface) of a vehicle. FIG. 1B illustrates a cross-sectional view taken along line E-E of FIG. 1A.

As illustrated in FIGS. 1A and 1B, the vehicle lamp 1 is provided with a lamp body 10 made of a synthetic resin and having a container shape that is opened forward, and an outer lens 11 which is assembled to shut the front opening of the lamp body 10. The lamp body 10 and the outer lens 11 define a lamp chamber S.

A base unit 3a configured to hold a light source (e.g., LED) (not illustrated), and a substantially elliptical reflector 3 made of a synthetic resin and provided in the base unit 3a are disposed within the lamp chamber S. The reflector 3 is supported at three points including aiming points 4 and 6, and an aiming fulcrum 5, via brackets 23 and 24, and a bracket 33 which will be described later. An optical unit 2 (as an example of the optical member) is constituted by the base unit 3a, the reflector 3, the brackets 23 and 24, and the bracket 33.

The aiming point 4 and the aiming fulcrum 5 are disposed to be vertically spaced apart from each other at the left side of the vehicle lamp 1 when viewed from the front side (see, e.g., FIG. 1A). The aiming point 6 and the aiming fulcrum 5 are disposed to be horizontally spaced apart from each other at the upper section when viewed from the front side.

A lower support unit 12 that forms the aiming point 4, an upper support unit (as an example of the supporting unit) 13 that forms the aiming fulcrum 5, and a right side support unit (not illustrated) that forms the aiming point 6 are provided within the lamp chamber S. The lower support unit 12, the upper support unit 13, and the right side support unit constitute an aiming mechanism which is capable of adjusting the direction of the optical unit 2 (the reflector 3) with respect to the lamp body 10.

The reflector 3 is configured to be vertically tiltable around the horizontal axis passing through the aiming point 6 and the aiming fulcrum 5 by the aiming mechanism. Also, the reflector 3 is configured to be horizontally tiltable around the vertical axis passing through the aiming point 4 and the aiming fulcrum 5.

The lower support unit 12 is provided with an aiming screw 21 that extends from the rear wall of the lamp body 10, a nut member 22 that is screwed to the aiming screw 21, and a bevel gear 25 that is integrally formed on the rear end portion of the aiming screw 21.

The aiming screw 21 penetrates a screw insertion hole 101 formed in the rear wall of the lamp body 10 to extend in the front-rear direction.

The nut member 22 moves back and forth along the aiming screw 21 when the aiming screw 21 is rotated. The aiming screw 21 may be rotated by engaging a driver (e.g., a screwdriver) with the bevel gear 25.

The nut member 22 and the reflector 3 are connected through the brackets 23 and 24. The brackets 23 and 24 are disposed at both the upper and lower sides of the nut member 22, respectively. The rear side end of each of the brackets 23 and 24 is fitted on the nut member 22, and the front side end is connected to the back surface of the reflector 3.

The right side support unit that forms the aiming point 6 has almost the same configuration as the lower support unit 12 that forms the aiming point 4.

The upper support unit 13 functions as a fixed aiming fulcrum. The upper support unit 13 tiltably supports the optical unit 2 in order to finely adjust the direction of the reflector 3 with respect to the lamp body 10.

The upper support unit 13 is provided with a pivot member (as an example of the first member) 31, and a bearing member (as an example of the second member) 32 that supports the pivot member 31. The pivot member 31 is connected to the bracket 33 that is connected to the reflector 3.

Figure 2A:
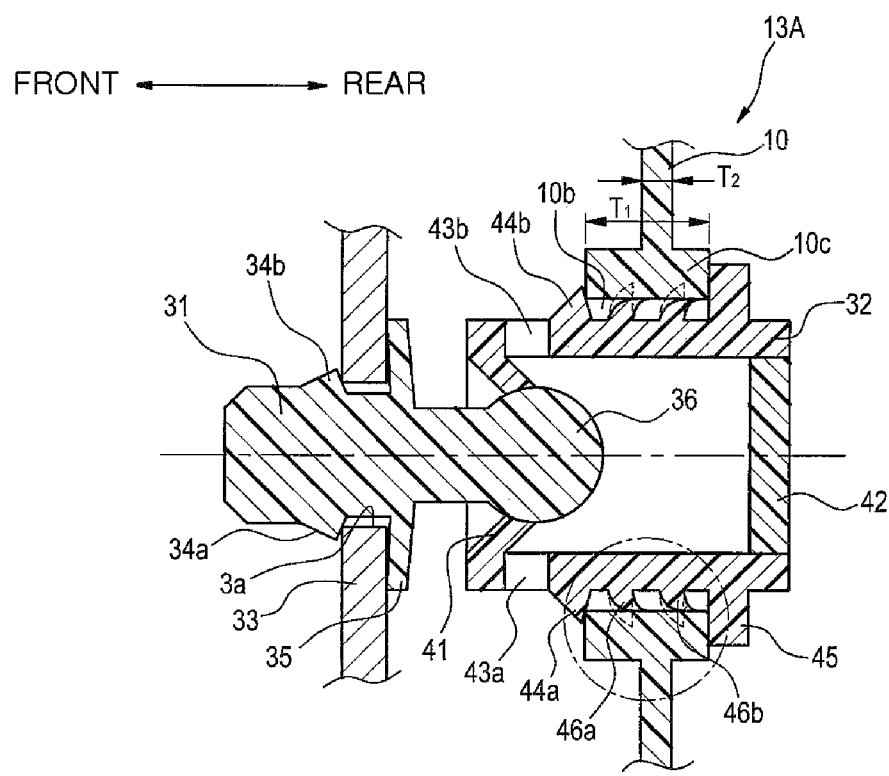
FIG. 2A is a cross-sectional view illustrating an upper support unit of an aiming mechanism provided in the vehicle lamp of FIG. 1B.
Figure 2B:
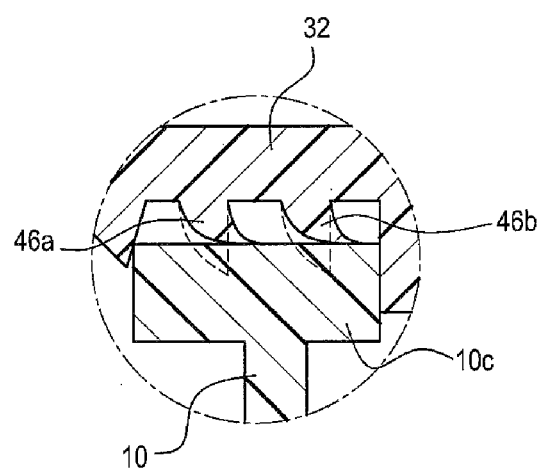
FIG. 2B is a partially enlarged view illustrating a seal structure of FIG. 2A.

FIGS. 2A and 2B illustrate enlarged views of the upper support unit 13.

The pivot member 31 of the upper support unit 13 is made of a synthetic resin, and in the present example, a resin pivot for high load is used in which a PPS resin sliding material is bonded to the resin pivot through injection molding.

A pivot insertion hole 3a configured to attach the pivot member 31 is formed in the bracket 33 of the optical unit 2.

The pivot member 31 has a locking structure, and is formed with locking portions 34a and 34b (at least two locking portions in the circumferential direction) at the outside thereof. The locking portions 34 and 34b are constituted by elastic pieces. The locking portions 34a and 34b are locked to the front surface of the bracket 33.

A positioning protrusion 35 is formed along the entire circumference (in a ring shape) of the pivot member 31. At the position of the protrusion 35, the diameter of the pivot member 31 is larger than the diameter of the pivot insertion hole 3a, and the protrusion 35 is locked to the rear surface of the bracket 33. The pivot member 31 is locked and fixed to the reflector 3 by the locking portions 34a and 34b and the protrusion 35. A ball portion 36 that is engaged with the bearing member 32 is formed at the rear end of the pivot member 31.

The bearing member 32 is made of a synthetic resin and attached to the lamp body 10. The lamp body 10 is formed with a bearing insertion hole (as an example of the opening) 10b configured to attach the bearing member 32. A thick wall portion (as an example of the fixing portion) 10c configured to fix the bearing member 32 is formed on the periphery of the bearing insertion hole 10b of the lamp body 10. The thick wall portion 10c is formed in a cylindrical shape that has a larger thickness T1 than an outer wall thickness T2 of the lamp body 10.

The bearing member 32 has a substantially cylindrical shape, and the end thereof at the pivot member 31 side (the front side) is provided with a bearing portion 41 of a pivot. Also, at the opposite side (the rear side), a cover 42 is attached to the end of the bearing member 32 in which the cover 42 is made of a resin which is formed through outsert molding. By the cover 42, water-tightness of the inside of the bearing member 32 for the rear side of the lamp body 10 may be secured.

Air holes 43a and 43b that penetrate the inside of the bearing member 32 are provided in the side wall of a portion of the bearing member 32 disposed inside the lamp body 10.

The bearing member 32 has a locking structure which is formed with locking portions 44a and 44b (at least two locking portions) at plural positions in the outside circumferential direction in the vicinity of the bearing portion 41 side. The locking portions 44a and 44b are constituted by elastic pieces.

On the outer surface of the bearing member 32, a positioning protrusion 45 is formed along the entire circumference (in a ring shape) at a position in the vicinity of the cover 42 side. At the position of the protrusion 45, the diameter of the bearing member 32 is larger than the diameter of the bearing insertion hole 10b, and the protrusion 45 is abutted on the rear surface of the thick wall portion 10c of the lamp body 10.

On the outer surface of the bearing member 32, a plurality of waterproof pins 46a, 46b are formed between the locking portions 44a and 44b, and the protrusion 45 along the entire circumference (in a ring shape) in the axial (front-rear) direction.

FIG. 2B illustrates an enlarged view of a part where the waterproof pins 46a and 46b are formed.

The waterproof pins 46a and 46b are constituted by elastic resin members, and at the position of the waterproof pins 46a and 46b, the outer diameter of the bearing member 32 is slightly larger than the diameter of the bearing insertion hole 10b.

With the above described configuration, when the pivot member 31 is gradually inserted into the pivot insertion hole 3a of the bracket 33 from the rear side, the locking portions 34a and 34b are locked to the front surface of the bracket 33, thereby suppressing the pivot member 31 from being released backwards with respect to the bracket 33. Further, the protrusion 35 is locked to the rear surface of the bracket 33, thereby suppressing the pivot member 31 from being released forwards. Accordingly, the pivot member 31 may be fixed to the bracket 33 through a simple operation of merely inserting the pivot member 31 into the pivot insertion hole 3a.

When the bearing member 32 is gradually inserted into the bearing insertion hole 10b of the lamp body 10 from the rear side, the locking portions 44a and 44b are locked to the front surface of the thick wall portion 10c of the bearing insertion hole 10b, thereby suppressing the bearing member 32 from being released backwards with respect to the lamp body 10.

When the bearing member 32 is inserted from the rear side of the lamp body 10, the protrusion 45 is abutted on the rear surface of the thick wall portion 10c of the bearing insertion hole 10b, thereby suppressing the bearing member 32 from being released toward the inside of the lamp body 10. The bearing member 32 may be fixed to the lamp body 10 by the locking portions 44a and 44b, and the protrusion 45 through a simple operation of merely inserting the bearing member 32 into the bearing insertion hole 10b.

When the bearing member 32 is inserted into the bearing insertion hole 10b from the rear side of the lamp body 10, the waterproof pins 46a and 46b come in contact with the inner circumferential surface of the thick wall portion 10c of the lamp body 10, and then elastically deformed backwards as illustrated in FIG. 2B. While the waterproof pins 46a and 46b are closely adhered to the thick wall portion 10 through elastic deformation, a gap between the bearing member 32 and the lamp body 10 is elastically sealed.

The pivot member 31 attached to the bracket 33 of the optical unit 2 is tiltably supported with respect to the lamp body 10 by engaging the ball portion 36 with the bearing portion 41 of the bearing member 32.

In the vehicle lamp 1 according to the present exemplary embodiment, when the upper support unit 13 of the aiming mechanism is configured by engaging the pivot member 31 with the bearing member 32, the assembly may be performed by each of one-touch operations of inserting the pivot member 31 into the pivot insertion hole 3a, inserting the bearing member 32 into the bearing insertion hole 10b, and inserting the pivot member 31 into the bearing member 32, thereby engaging the pivot member 31 and the bearing member 32 with each other. Accordingly, the assembly may be performed only by one-touch insertion operations without needing to use a mechanical equipment dedicated only for pivot attachment which has been used in the related art. As a result, the production efficiency may be considerably improved. In addition, since the dedicated mechanical equipment is not required the cost of a manufacturing facility may be reduced. Further, since no space is required for installing the dedicated mechanical equipment, the production line may be shortened.

In the related art, a configuration free of an opening in a lamp body has been employed from the viewpoint of waterproofing. However, in the present exemplary embodiment, the bearing insertion hole 10b is formed in the lamp body 10. In this case, the water-tightness within the lamp body 10 is secured by making the inner circumferential surface of the cylindrical thick wall portion 10c provided at the periphery of the bearing insertion hole 10b and the waterproof pins 46a and 46b provided at the outer circumference of the bearing member 32 come in contact with each other to be closely adhered to each other. In this manner, since the thick wall portion 10c of the bearing insertion hole 10b which comes in contact with the waterproof pins 46a and 46b has a predetermined thickness (the length in the insertion direction of the bearing member 32), infiltration of water into the lamp chamber S may be securely suppressed. Further, it is possible to securely maintain the bearing member 32 at a predetermined position by suppressing backlash when the bearing member 32 is fixed.

The positioning protrusion 35 formed on the pivot member 31 is not limited to the ring-shaped protrusion. For example, it may be constituted by a plurality of protrusions partially formed on the circumference. This also applies to the positioning protrusion 45 formed on the bearing member 32.

First Modified Example

Figure 3A:
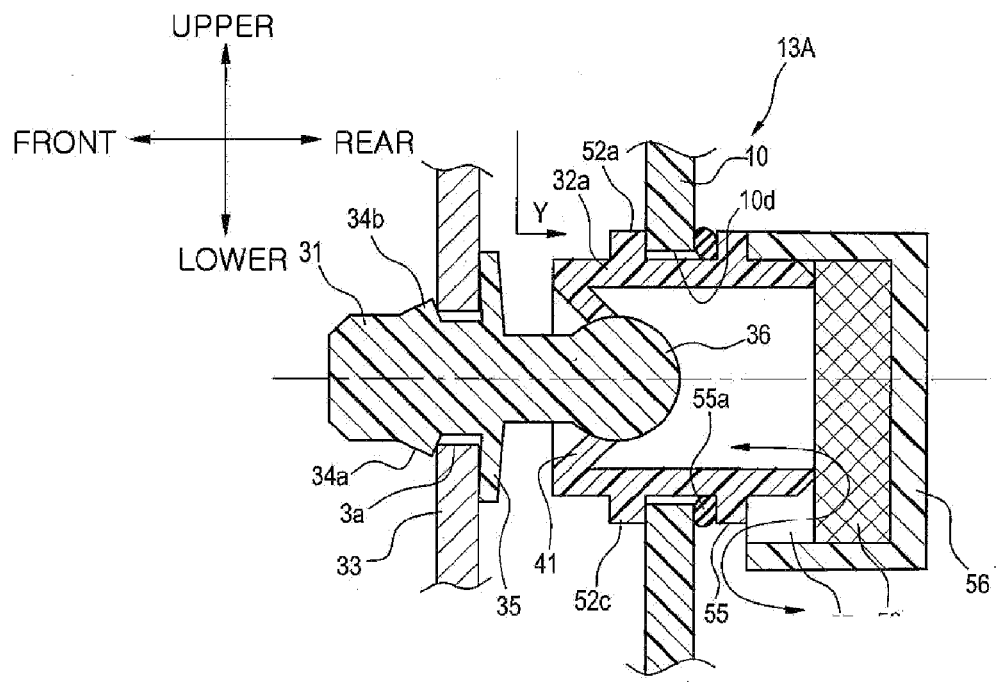
FIG. 3A is a cross-sectional view illustrating a first modified example of the upper support unit.
Figure 3B:
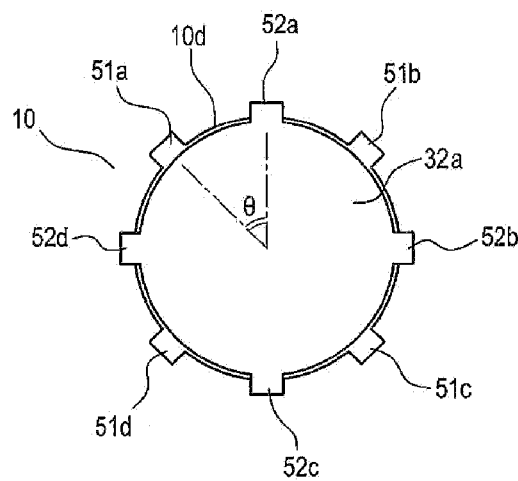
FIG. 3B is a view illustrating a rotary assembly structure of FIG. 3A.

FIGS. 3A and 3B illustrate a first modified example (an upper support unit 13A) of the upper support unit 13. In the following description, the parts which are the same as or similar to those in the upper support unit 13 will be assigned the same reference numerals, and the descriptions thereof will be appropriately omitted.

FIG. 3B illustrates a rotary assembly structure constituted by a bearing member 32a and a bearing insertion hole 10d, when viewed in the direction of arrow Y of FIG. 3A. The bearing insertion hole 10d of the lamp body 10 has a circular shape, and is formed with a plurality of concave portions 51a to 51d (four concave portions in this example) on the inner wall thereof.

The bearing member 32a has a substantially cylindrical shape in which the front side end of the bearing member 32a is provided with a bearing portion 41 of a pivot, and the rear side end of the bearing member 32a is formed with an opening. A breathing hole cap 56 is mounted at the opening.

The breathing hole cap 56 has a larger diameter than the bearing member 32a. When the breathing hole cap 56 is mounted in the bearing member 32a, a gap 57 is formed between the rear side lower end of the bearing member 32a and the front side lower end of the breathing hole cap 56. The outer circumferential surface at the rear side upper portion of the bearing member 32a is abutted on the inner circumferential surface at the front side upper portion of the breathing hole cap 56.

The inside of the breathing hole cap 56 is filled with a ventilation member 58 which allows air to pass therethrough and blocks water. The opening at the rear side of the bearing member 32a is covered with the ventilation member 58. The lower portion of the ventilation member 58 blocks the gap 57 formed by the bearing member 32a and the breathing hole cap 56. Accordingly, the inner space and the outside of the bearing member 32a are configured to allow air to pass therethrough while blocking water by the ventilation member 58.

A plurality of convex portions 52a to 52d which correspond to the concave portions 51a to 51d of the bearing insertion hole 10d are formed on the outer circumferential surface at the front side of the bearing member 32a. The bearing member 32a and the lamp body 10 are assembled by inserting the convex portions 52a to 52d of the bearing member 32a into the corresponding positions of the concave portions 51a to 51d of the lamp body 10, and rotating them around an axis in the insertion direction. FIG. 3B illustrates a state where the bearing member 32a is inserted into the lamp body 10 and rotated by an angle θ.

A positioning protrusion 55 is formed along the entire circumference (in a ring shape) at the rear side of the bearing member 32a. At the position of the protrusion 55, the outer diameter of the bearing member 32a is slightly larger than the diameter of the bearing insertion hole 10d. When the bearing member 32a is inserted, the protrusion 55 is locked to the rear surface of the lamp body 10.

An elastomer resin material (as an example of the seal member) 55a having rubber-like elasticity is attached to the front surface of the protrusion 55 in order to secure water-tightness of the bearing insertion hole 10d, that is, water-tightness of the inside of the lamp body 10. When the bearing member 32a is inserted into the bearing insertion hole 10d from the rear side, the front surface of the protrusion 55 attached with the elastomer resin material 55a is abutted on the rear surface of the lamp body 10. The elastomer resin material 55a is secondarily molded on the front surface of the protrusion 55 after resin-molding of the bearing member 32a. Accordingly, the bearing member 32a on which the elastomer resin material 55a is integrally molded is formed.

With the above described configuration, the bearing member 32a is inserted from the rear side such that positions of the convex portions 52a to 52d of the bearing member 32a match with positions of the concave portions 51a to 51d of the bearing insertion hole 10d. The bearing member 32a is rotated around an axis in the insertion direction after inserted (after the inserted convex portions 52a to 52d pass through the position of the lamp body 10). Accordingly, the positions of the convex portions 52a to 52d of the bearing member 32a and the positions of the concave portions 51a to 51d of the bearing insertion hole 10d are deviated, which allows the bearing member 32a to be locked to the front surface of the lamp body 10. That is, the bearing member 32a is suppressed from being released backwards with respect to the lamp body 10.

When the bearing member 32a is inserted into the bearing insertion hole 10d from the rear side and assembled by rotation, the elastomer resin material 55a is in pressure contact against the rear surface of the lamp body 10. The elastomer resin material 55a seals the gap between the lamp body 10 and the protrusion 55 of the bearing member 32a by its elastic force, thereby assuring water-tightness of the lamp body 10.

When the bearing member 32a is inserted into the bearing insertion hole 10d from the rear side of the lamp body 10, the protrusion 55 with the elastomer resin material 55a attached thereto is locked to the rear surface of the lamp body 10, thereby suppressing the bearing member 32a from being released toward the inside with respect to the lamp body 10.

In this manner, the bearing member 32a may be fixed to the lamp body 10 through a simple operation of merely inserting the bearing member 32a into the bearing insertion hole 10d of the lamp body 10, and rotating the bearing member 32a.

When the breathing hole cap 56 is mounted in the bearing member 32a, the ventilation into the bearing member 32a may be secured, and at the same time, the water-tightness may be secured.

It is not necessary to integrally mold the elastomer resin material 55a on the front surface of the protrusion 55. Another configuration in which, instead of the elastomer resin material 55a, an O ring is provided between the protrusion 55 and the rear surface of the lamp body 10 may be employed.

Second Modified Example

Figure 4:
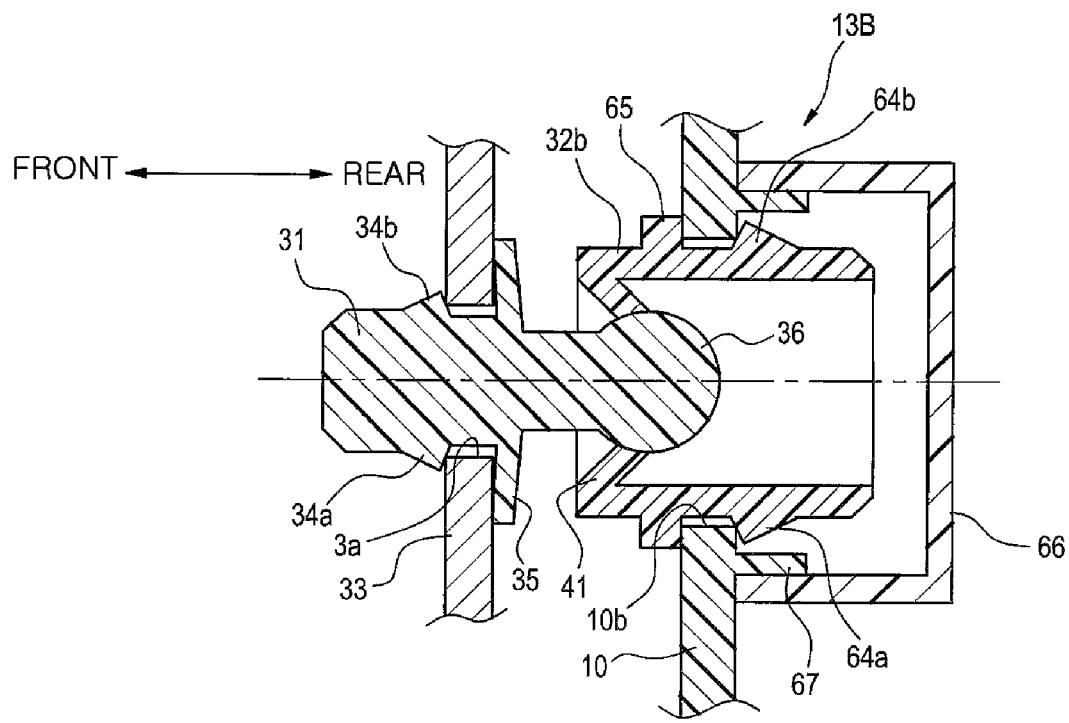
FIG. 4 is a cross-sectional view illustrating a second modified example of the upper support unit.

FIG. 4 illustrates a second modified example (an upper support unit 13B) of the upper support unit 13. In the following description, the parts which are the same as or similar to those in the upper support unit 13 as described above will be assigned the same reference numerals, and the descriptions thereof will be appropriately omitted.

A bearing insertion hole 10b is formed in the lamp body 10. A bearing member 32b is inserted into the bearing insertion hole 10b from the front side of the lamp body 10.

A cap attachment protrusion 67 is formed on the rear surface of the lamp body 10 along the entire circumference (in a ring shape). The outer diameter of the cap attachment protrusion 67 is larger than the diameter of the bearing member 32b, and when viewed from the rear side, the cap attachment protrusion 67 is formed to surround the outer circumference of the bearing member 32b.

The bearing member 32b has a substantially cylindrical shape in which the bearing member 32b is provided with a bearing portion 41 of a pivot at the front side end thereof and formed with an opening at the rear side end thereof.

The bearing member 32b has a locking structure which is formed with locking portions 64a and 64b (at least two locking portions) on the side surface at the rear side thereof.

A positioning protrusion 65 is formed along the entire circumference (in a ring shape) on the side surface of the bearing member 32b at the front side. At the position of the protrusion 65, the outer diameter of the bearing member 32b is larger than the diameter of the bearing insertion hole 10b.

The bearing member 32b is fixed to the lamp body 10 in a state where the front surfaces of the locking portions 64a and 64b are abutted on the rear surface of the lamp body 10, and the rear surface of the protrusion 65 is abutted on the front surface of the lamp body 10.

In a state where the bearing member 32b is attached to the lamp body 10, the opening of the bearing member 32b is disposed at the rear side of the lamp body 10. At the rear side of the lamp body 10, a waterproof cap 66 is provided to cover the opening of the bearing member 32b. The waterproof cap 66 is made of a rubber material.

The waterproof cap 66 is mounted at the outer periphery of the cap attachment protrusion 67, and the opening of the bearing member 32b is covered with the mounted waterproof cap 66.

With the above described configuration, when the bearing member 32b is gradually inserted into the bearing insertion hole 10b from the front side, the locking portions 64a and 64b pass through the bearing insertion hole 10b and are locked to the rear surface of the lamp body 10. As a result, the bearing member 32b is suppressed from being released forwards with respect to the lamp body 10. The rear surface of the protrusion 65 is locked to the front surface of the lamp body 10, thereby suppressing the bearing member 32b from being released backwards with respect to the lamp body 10.

In this manner, the bearing member 32b may be securely fixed to the lamp body 10 by the locking portions 64a and 64b and the protrusion 65 through a simple operation of merely inserting the bearing member 32b into the bearing insertion hole 10b of the lamp body 10.

When the waterproof cap 66 is mounted on the ring-shaped cap attachment protrusion 67 provided in the lamp body 10, the opening of the bearing member 32b may be covered, thereby securing water-tightness of the lamp body 10.

Third Modified Example

Figure 5:
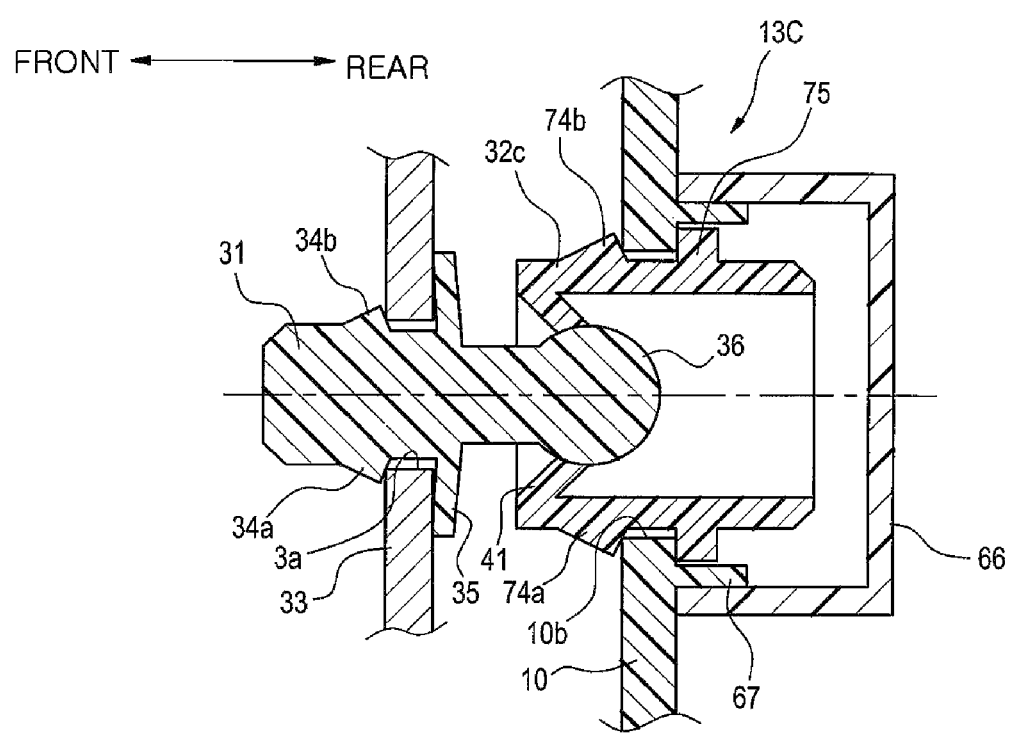
FIG. 5 is a cross-sectional view illustrating a third modified example of the upper support unit.

FIG. 5 illustrates a third modified example (an upper support unit 13C) of the upper support unit 13. In the following description, the parts which are the same as or similar to those in the upper support unit 13 as described above will be assigned the same reference numerals, and the descriptions thereof will be appropriately omitted.

A bearing insertion hole 10b is formed in the lamp body 10. A bearing member 32c is inserted into the bearing insertion hole 10b from the rear side of the lamp body 10.

The bearing member 32c has a substantially cylindrical shape in which the bearing member 32c is provided with a bearing portion 41 at the front side end thereof and formed with an opening at the rear side end thereof.

The bearing member 32c has a locking structure which is formed with locking portions 74a and 74b (at least two locking portions) on the side surface at the front side thereof.

A positioning protrusion 75 is formed along the entire circumference (in a ring shape) on the side surface of the bearing member 32c at the rear side. At the position of the protrusion 75, the outer diameter of the bearing member 32c is larger than the diameter of the bearing insertion hole 10b.

When the bearing member 32c is inserted into the bearing insertion hole 10b, the rear surfaces of the locking portions 74a and 74b are abutted on the front surface of the lamp body 10, and the front surface of the protrusion 75 is abutted on the rear surface of the lamp body 10.

With the above described configuration, when the bearing member 32c is gradually inserted into the bearing insertion hole 10b from the rear side of the lamp body 10, the rear surfaces of the locking portions 74a and 74b are locked to the front surface of the lamp body 10. As a result, the bearing member 32c is suppressed from being released backwards with respect to the lamp body 10. The front surface of the protrusion 75 is locked to the rear surface of the lamp body 10, thereby suppressing the bearing member 32c from being released with respect to the lamp body 10.

In this manner, the bearing member 32c may be fixed to the lamp body 10 by the locking portions 74a and 74b and the protrusion 75 through a simple operation of merely inserting the bearing member 32c into the bearing insertion hole 10b of the lamp body 10.

Fourth Modified Example

Figure 6:
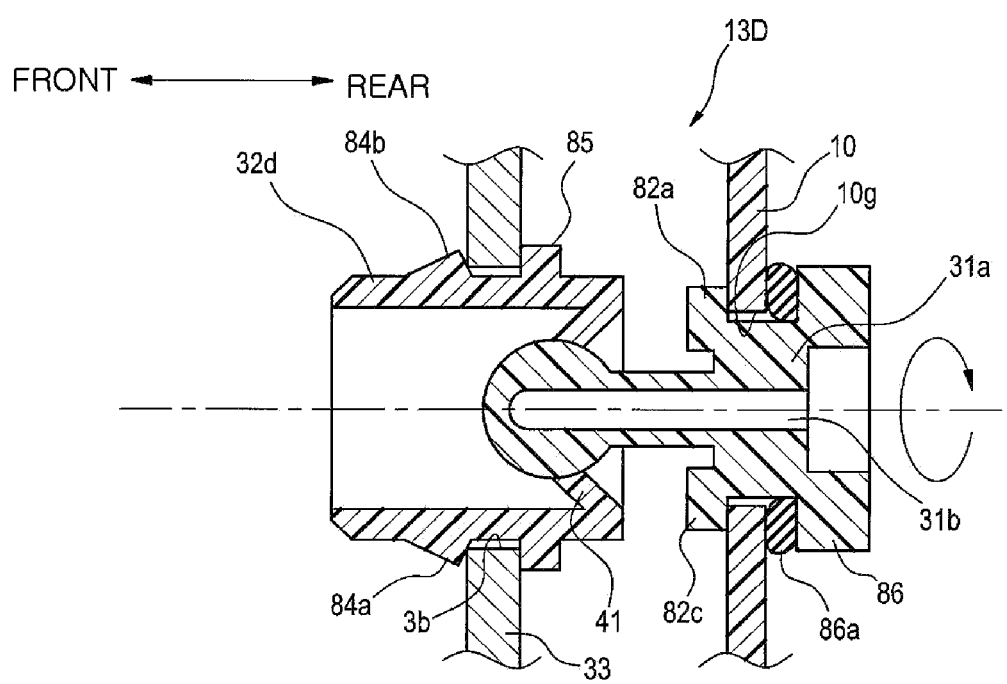
FIG. 6 is a cross-sectional view illustrating a fourth modified example of the upper support unit.

FIG. 6 illustrates a fourth modified example (an upper support unit 13D) of the upper support unit 13.

The upper support unit 13D has a configuration which is different from the upper support unit 13 illustrated in FIGS. 2A and 2B in that a bearing member (as an example of the first member) 32d is attached to a bracket 33 via a bearing insertion hole 3b, and a pivot member (as an example of the second member) 31a is attached to a lamp body 10 via a pivot insertion hole 10g. Hereinafter, the upper support unit 13D will be described. The parts which are the same as or similar to those in the upper support unit 13 as described above will be assigned the same reference numerals, and the descriptions thereof will be appropriately omitted.

A bearing insertion hole 3b is formed in the bracket 33, and the bearing member 32d is inserted into the bearing insertion hole 3b from the rear side.

The bearing member 32d has a substantially cylindrical shape in which the bearing member 32d is provided with a bearing portion 41 of a pivot at the rear side end thereof and formed with an opening at the front side end thereof.

The bearing member 32d has a locking structure which is formed with locking portions 84a and 84b (at least two locking portions) on the side surface at the front side thereof. The locking portions 84a and 84b are constituted by elastic pieces.

The bearing member 32d is formed with a positioning protrusion 85 along the entire circumference (in a ring shape) on the side surface thereof at the rear side. At the position of the protrusion 85, the outer diameter of the bearing member 32c is larger than the diameter of the bearing insertion hole 3b.

When the bearing member 32d is inserted into the bearing insertion hole 3b, the rear surfaces of the locking portions 84a and 84b are abutted on the front surface of the bracket 33, and the front surface of the protrusion 85 is abutted on the rear surface of the bracket 33.

The pivot insertion hole 10g is formed in the lamp body 10, and the pivot member 31a is inserted into the pivot insertion hole 10g from the rear side of the lamp body 10.

The pivot insertion hole 10g of the lamp body 10 has a circular shape, and is formed with a plurality of concave portions (not illustrated) (hereinafter, referred to as concave portions 81a to 81d) like the concave portions 51a to 51d of the bearing insertion hole 10b as illustrated in FIG. 3B.

A plurality of convex portions 82a to 82d are formed at the front side end of the pivot member 31a like the convex portions 52a to 52d illustrated in FIGS. 3A and 3B. The convex portions 82a to 82d have a shape corresponding to that of the plurality of concave portions 81a to 81d formed in the pivot insertion hole 10g. The pivot member 31a may be assembled with the lamp body 10 by inserting the convex portions 82a to 82d of the pivot member 31a into the concave portions 81a to 81d of the pivot insertion hole 10g, and rotating them around an axis in the insertion direction.

The pivot member 31a is formed with a positioning protrusion 86 along the entire circumference (in a ring shape) on the side surface thereof at the rear side in the insertion direction. At the position of the protrusion 86, the outer diameter of the pivot member 31a is larger than the diameter of the pivot insertion hole 10g. When the pivot member 31a is inserted, the front surface of the protrusion 86 is locked to the rear surface of the lamp body 10.

An elastomer resin material 86a having rubber-like elasticity is attached to the front surface of the protrusion 86 in order to secure water-tightness of the pivot insertion hole 10g, that is, water-tightness of the inside of the lamp body 10. When the pivot member 31a is inserted into the pivot insertion hole 10g and then rotated, the elastomer resin material 86a attached to the front surface of the protrusion 86 is crushed, and abutted on the rear surface of the opening of the lamp body 10.

At the center of the pivot member 31, a cavity 31b is formed to improve the strength of the pivot member 31 (in order to suppress the occurrence of voids due to bubbles remaining inside at the time of molding).

The pivot member 31a attached in this manner is engaged with and supported by the pivot bearing portion 41 of the bearing member 32d.

With the above described configuration, it is possible to easily and securely assemble the pivot member 31a with the lamp body 10, and the bearing member 32d with the bracket 33 by one-touch operation such as rotary assembly or sliding assembly.

Fifth Modified Example

Figure 7:
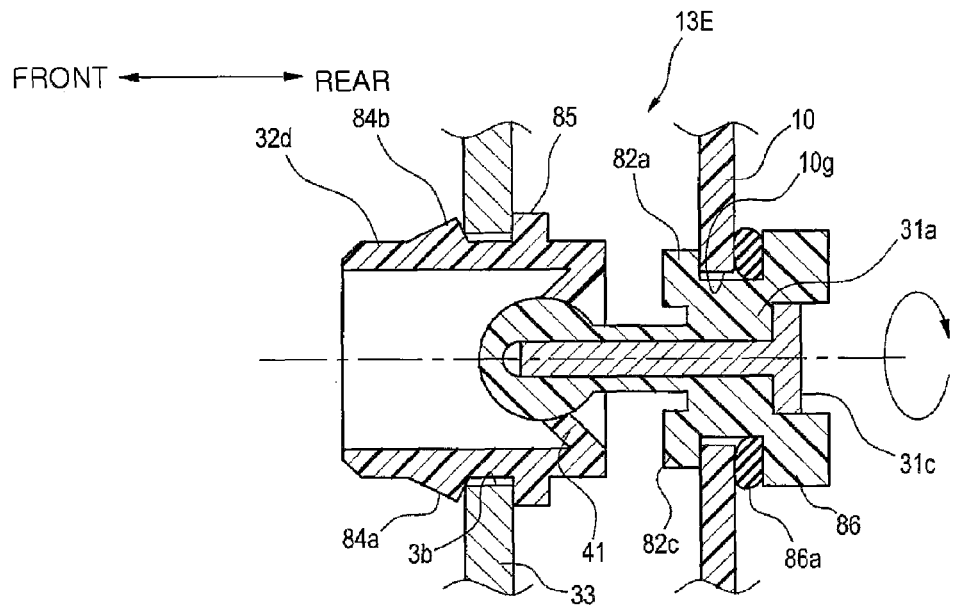
FIG. 7 is a cross-sectional view illustrating a fifth modified example of the upper support unit.

FIG. 7 illustrates a fifth modified example (upper support unit 13E) of the upper support unit 13.

The upper support unit 13E is provided with a knurled metal shaft 31c having a substantially T shape in which the metal shaft 31c is inserted into the cavity 31b formed at the center of the pivot member 31a in the upper support unit 13D illustrated in FIG. 6. Alternatively, the metal shaft 31c may be mounted in the pivot member 31a by insert molding.

With the above described configuration, in addition to the acting effects of the upper support unit 13D illustrated in FIG. 6, the strength of the pivot member 31a may be further improved and the upper support unit 13E may be further stabilized, thereby enabling more secure aiming adjustment.

Sixth Modified Example

Figure 8:
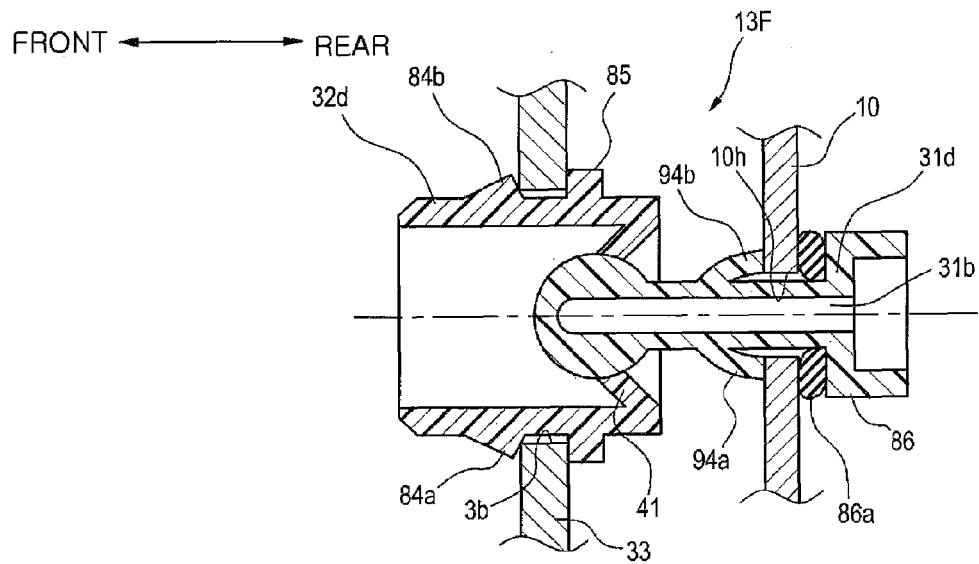
FIG. 8 is a cross-sectional view illustrating a sixth modified example of the upper support unit.

FIG. 8 illustrates a sixth modified example (upper support unit 13F) of the upper support unit 13.

A pivot member 31d is inserted into a pivot insertion hole 10h from the rear side of the lamp body 10. The pivot member 31d has a lance locking structure, and is formed with lances 94a and 94b (at least two lances) on the outer circumferential surface thereof. The lances 94a and 94b are constituted by elastic pieces. When the pivot member 31d is inserted into the pivot insertion hole 10h, the lances 94a and 94b are locked to the front surface of the lamp body 10.

The pivot member 31d is fixed to the lamp body 10 only by assembling the pivot member 31d with the pivot insertion hole 10h in a sliding manner in a state where the lances 94a and 94b are abutted on the front surface of the lamp body 10, and an elastomer resin material 86a integrally molded on the front surface of a protrusion 86 is abutted on the rear surface of the lamp body 10.

With the above described configuration, the upper support unit 13F may achieve the same effects as those in the upper support unit 13D illustrated in FIG. 6.

Seventh Modified Example

Figure 9:
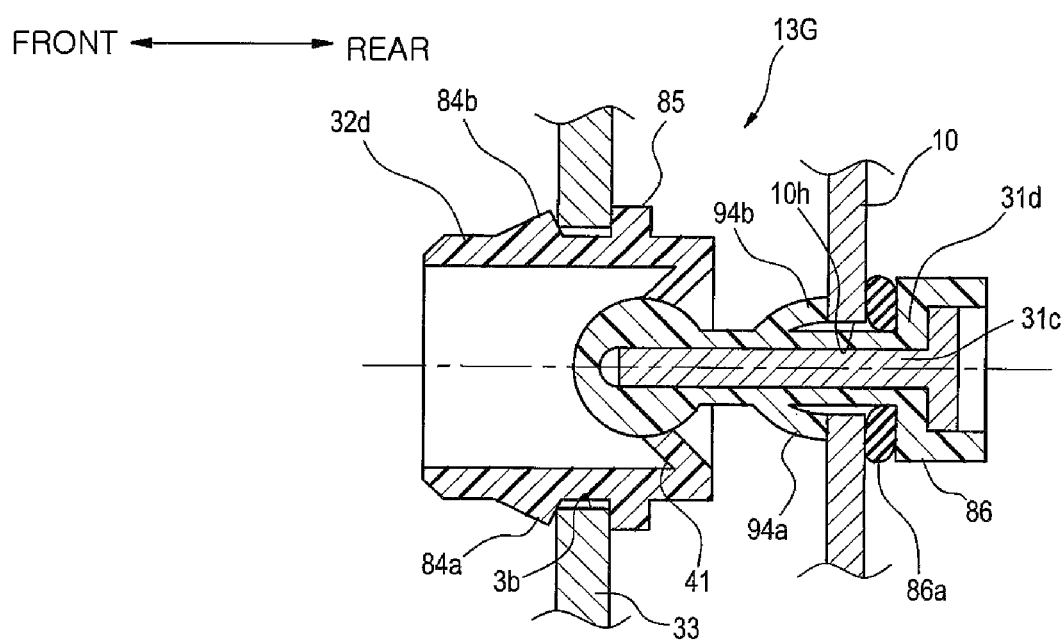
FIG. 9 is a cross-sectional view illustrating a seventh modified example of the upper support unit.

FIG. 9 illustrates a seventh modified example (upper support unit 13G) of the upper support unit 13.

The upper support unit 13G is provided with a knurled metal shaft 31c having a substantially T shape in which the metal shaft 31c is inserted into the cavity 31b formed at the center of the pivot member 31d in the upper support unit 13F illustrated in FIG. 8. Alternatively, the metal shaft 31c may be mounted in the pivot member 31d by insert molding.

With the above described configuration, in addition to the acting effects of the upper support unit 13F illustrated in FIG. 8, the strength of the pivot member 31d may be further improved and the upper support unit 13G may be further stabilized, thereby enabling more secure aiming adjustment.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
an optical member;
a first member fixed to the optical member;
a lamp body having an opening; and
a second member fixed to the lamp body to be engageable with the first member,
wherein the first member and the second member are engaged with each other to constitute at least one supporting unit of an aiming mechanism, and the optical member is tiltably supported by the aiming mechanism, and
the second member has a cylindrical shape having a front side opening inserted into the opening of the lamp body so as to be fixed to the lamp body and a rear side opening covered by a cover.

2. The vehicle lamp of claim 1, wherein the lamp body includes a cylindrical fixing portion configured to fix the second member to a periphery of the opening, and a thickness of the fixing portion is larger than a thickness of an outer wall of the lamp body in an insertion direction of the second member.

3. The vehicle lamp of claim 2, wherein a waterproof pin is formed on an outer circumference of the second member, the waterproof pin being configured to be in contact with an inner circumferential surface of the cylindrical fixing portion.

4. The vehicle lamp of claim 1, wherein the second member is integrally formed with a seal member at a portion where the second member is locked to an outer wall surface around the opening of the lamp body, the seal member being configured to water-tightly seal the opening.

5. The vehicle lamp of claim 2, wherein the second member is integrally formed with a seal member at a portion where the second member is locked to an outer wall surface around the opening of the lamp body, the seal member being configured to water-tightly seal the opening.

6. The vehicle lamp of claim 3, wherein the second member is integrally formed with a seal member at a portion where the second member is locked to an outer wall surface around the opening of the lamp body, the seal member being configured to water-tightly seal the opening.

7. The vehicle lamp of claim 4, wherein the second member is fixed to the lamp body by being rotated around an axis in an insertion direction of the second member after being inserted into the opening.

8. The vehicle lamp of claim 5, wherein the second member is fixed to the lamp body by being rotated around an axis in an insertion direction of the second member after being inserted into the opening.

9. The vehicle lamp of claim 6, wherein the second member is fixed to the lamp body by being rotated around an axis in an insertion direction of the second member after being inserted into the opening.

10. The vehicle lamp of claim 1, wherein the cover that covers the rear side opening of the second member is a breathing hole cap provided with a ventilation member.

11. A vehicle lamp comprising:
an optical member;
a first member fixed to the optical member;
a lamp body having an opening; and
a second member fixed to the lamp body to be engageable with the first member,
wherein an insertion direction for fixing the first member and the second member is a same direction from a rear side to a front side,
the first member and the second member are engaged with each other to constitute at least one supporting unit of an aiming mechanism, and the optical member is tiltably supported by the aiming mechanism, and
the second member is inserted into the opening of the lamp body so as to be fixed to the lamp body.

12. The vehicle lamp of claim 11, wherein the first member is inserted into a bearing insertion hole of the optical member from the rear side so as to be fixed, and the second member is inserted into a pivot insertion hole of the lamp body from the rear side so as to be fixed.

* * * * *